United States Patent
Duncan et al.

(10) Patent No.: US 7,283,555 B2
(45) Date of Patent: Oct. 16, 2007

(54) METHOD AND APPARATUS FOR DETERMINING A POLLING INTERVAL IN A NETWORK MANAGEMENT SYSTEM

(75) Inventors: Robert J. Duncan, Edinburgh (GB); Christopher R. Linzell, St. Albans (GB); David J. Stevenson, Livingston (GB); Iain Hogg, Edinburgh (GB)

(73) Assignee: 3Com Corporation, Marlborough, MA (US)

( * ) Notice: Subject to any disclaimer, the term of this patent is extended or adjusted under 35 U.S.C. 154(b) by 1026 days.

(21) Appl. No.: 10/179,440

(22) Filed: Jun. 25, 2002

(65) Prior Publication Data

US 2003/0169761 A1  Sep. 11, 2003

(30) Foreign Application Priority Data

Mar. 7, 2002  (GB) ................ 0205391.6

(51) Int. Cl.
*H04L 12/42* (2006.01)
(52) U.S. Cl. .................. 370/449; 370/248
(58) Field of Classification Search ........ 370/449–457, 370/248
See application file for complete search history.

(56) References Cited

U.S. PATENT DOCUMENTS

| 3,990,046 | A | * | 11/1976 | Katz et al. ............ 709/230 |
| 4,168,532 | A | * | 9/1979 | Dempsey et al. ........ 710/60 |
| 5,323,145 | A | * | 6/1994 | Simmering ............ 370/242 |
| 5,442,629 | A | * | 8/1995 | Geyer et al. ........... 370/252 |
| 5,566,351 | A | * | 10/1996 | Crittenden et al. ....... 710/46 |
| 5,973,609 | A | * | 10/1999 | Schoch ................ 370/449 |
| 6,173,323 | B1 | | 1/2001 | Moghe |
| 6,449,663 | B1 | * | 9/2002 | Carney et al. ........... 710/15 |
| 6,519,264 | B1 | * | 2/2003 | Carr et al. ............ 370/449 |
| 6,646,991 | B1 | * | 11/2003 | Drottar et al. .......... 370/238 |
| 6,657,987 | B1 | * | 12/2003 | Kumar et al. .......... 370/346 |
| 6,744,780 | B1 | * | 6/2004 | Gu et al. .............. 370/450 |
| 6,956,866 | B1 | * | 10/2005 | Li et al. .............. 370/449 |
| 6,963,534 | B1 | * | 11/2005 | Shorey et al. .......... 370/230 |
| 7,007,119 | B2 | * | 2/2006 | Howard et al. ......... 710/100 |
| 7,013,336 | B1 | * | 3/2006 | King ................. 709/224 |
| 7,016,372 | B2 | * | 3/2006 | Haartsen .............. 370/461 |
| 2002/0039369 | A1 | * | 4/2002 | Koo .................. 370/449 |
| 2003/0137986 | A1 | * | 7/2003 | Kaku et al. ............ 370/449 |

FOREIGN PATENT DOCUMENTS

EP  0 777 357  6/1997

\* cited by examiner

Primary Examiner—Min Jung

(57) ABSTRACT

A method and apparatus for determining a time interval for periodically polling a device on a network 1 is described. The method determines the most restrictive link on the path to the network device, the level of restrictiveness of a link being dependent on the nature of the link, such as the link speed and link type. The time interval between polling is determined based on the nature of the most restrictive link. Thus, the time interval can be determined according to the type and speed of the links between the polling device, which in a preferred embodiment is a network management station, and the polled device on the network 1.

7 Claims, 2 Drawing Sheets

METHOD AND APPARATUS FOR DETERMINING A POLLING INTERVAL IN A NETWORK MANAGEMENT SYSTEM

BACKGROUND OF THE INVENTION

1. Field of the Invention

The present invention relates to the retrieval of data by polling a device on a network, and more particularly to a method for adjusting the polling interval according to characteristics of the network.

2. Description of the Related Art

The present invention will be described in relation to the retrieval of network management data by a network management software application. However, the skilled person will appreciate that the invention can be used for many other purposes in which data is collected by periodically polling a device on a network.

Network management applications are commonly used to monitor the performance of a network. For example, a network management application may monitor network activity to determine that the devices and links forming the network are operating efficiently, and are not unduly congested with network traffic. Monitoring typically includes "polling" network devices. Polling may involve performing tests for device activity and service availability, and sending requests to managed network devices for management data indicative of device and link operation, at predetermined periodic intervals.

For example GB-A-2 350 035 describes a network management application which performs periodic polling of devices on a Local Area Network (LAN), and which retrieves network management data using the Simple Network Management Protocol (SNMP). In accordance with the SNMP protocol, the SNMP manager in the network management station, running the network management application, sends polling requests, at periodic intervals, to the SNMP agents of managed network devices on the network to retrieve specified SNMP MIB data relating to characteristics, such as traffic activity or errors occurring at a particular port, for processing by the network management station. In addition, the network management station performs polling tests at periodic intervals, including sending ICMP Ping requests to each device on the network, and sending selected requests for services such as SMTP, NFS and DNS to servers, and monitoring the time taken to receive a response. If a response is not received in a predetermined time interval a "timeout" is recorded which may indicate that the monitored device is not operating correctly or there is a problem with a link between the monitored device and the network management station.

An example of a network management application which performs periodic polling of network devices is the 3Com® Network Supervisor, available from 3Com Corporation of Santa Clara, USA.

The polling interval for a particular request or test sent to a particular network device is typically preset in the network management application, and is dependent upon the monitored characteristic, the type of device being polled etc. Typically the polling interval is in the range of 30 seconds to 5 minutes, which, if a large number of network devices are being monitored, generates a significant quantity of network traffic that may cause congestion on the network. Moreover, if links between monitored network devices and the management station running the network management application are relatively slow speed links, the delays in the monitoring traffic may cause problems.

For example, if a network administrator is running a network management application at a location remote from the monitored network, for example via a modem connection (via the PSTN) or a Wide Area Network (WAN) link, the slow speed of the link may cause polling requests and polling responses to be delayed, thus resulting in the network management application reporting "timeouts". Such timeouts may give the network administrator a false impression about the state of the network by suggesting that there are problems on the monitored network that do not exist.

In addition, the problem of congestion increases if a link between the network management station and the monitored network is shared with other network users, as is the case with a WAN link, since the congestion caused by the network management traffic may unacceptably slow reduce the bandwidth available to other users, thus slowing down network communications for other users.

Finally, another problem arises if the network management traffic utilised a "dial-on-demand" link, such as an ISDN line, in which the link is made upon data being sent and broken a predetermined time after the link stops being used. In particular, polling may cause the link to be continually made and broken, for example if the polling interval is 2 minutes and the line is automatically disconnected after 60 seconds of inactivity, which has undesirable cost implications and represents a poor use of the link.

In order to address these problems, the present invention provides a method for adapting the polling interval for the monitoring of a particular characteristic of a device on a network according to network characteristics, and in particular according to the nature of the links carrying the monitoring requests and responses.

SUMMARY OF THE INVENTION

In accordance with a first aspect, the present invention provides a method for determining a time interval for periodically polling a device on a network, the method comprising determining the most restrictive link to the network device, the most restrictive link being dependent on the nature of the link, and determining the time interval in accordance with the nature of the most restrictive link.

By determining the polling interval according to the nature (e.g. type and speed) of the most restrictive link to the polled network device, congestion due to polling traffic can be minimised (i.e. by increasing the polling interval for slower and/or shared links), unnecessary use of dial on demand links can be avoided (e.g. by increasing the polling interval), and more polling information can be gathered where link speed and bandwidth is available (i.e. by reducing the polling interval where the default polling interval is unnecessarily high).

Preferably, the method is performed by a polling device on a network, the polling device periodically polling a plurality of devices on the network.

In a preferred embodiment the nature of the most restrictive link is determined using the steps of: determining the nature of the link of the local network to which the polling device is connected; determining the nature of the restrictive link to the subnet to which the polled device is connected, and comparing the nature of the determined links.

In accordance with a second aspect, the present invention provides a computer program for carrying out a method in accordance with a first aspect of the present invention.

In accordance with a third aspect, the present invention provides a network management apparatus for periodically polling devices on a network, the apparatus configured to determine a time interval for periodically polling a device on a network by determining the most restrictive link to the network device, the apparatus being configured to determine the time interval in accordance with the nature of the most restrictive link.

Further preferred features and advantages of the present invention will be apparent from the following description and accompanying claims.

BRIEF DESCRIPTION OF THE DRAWINGS

The present invention will now be described, by way of example, with reference to the accompanying drawings, in which.

DETAILED DESCRIPTION OF THE PREFERRED EMBODIMENTS

Figure 1:
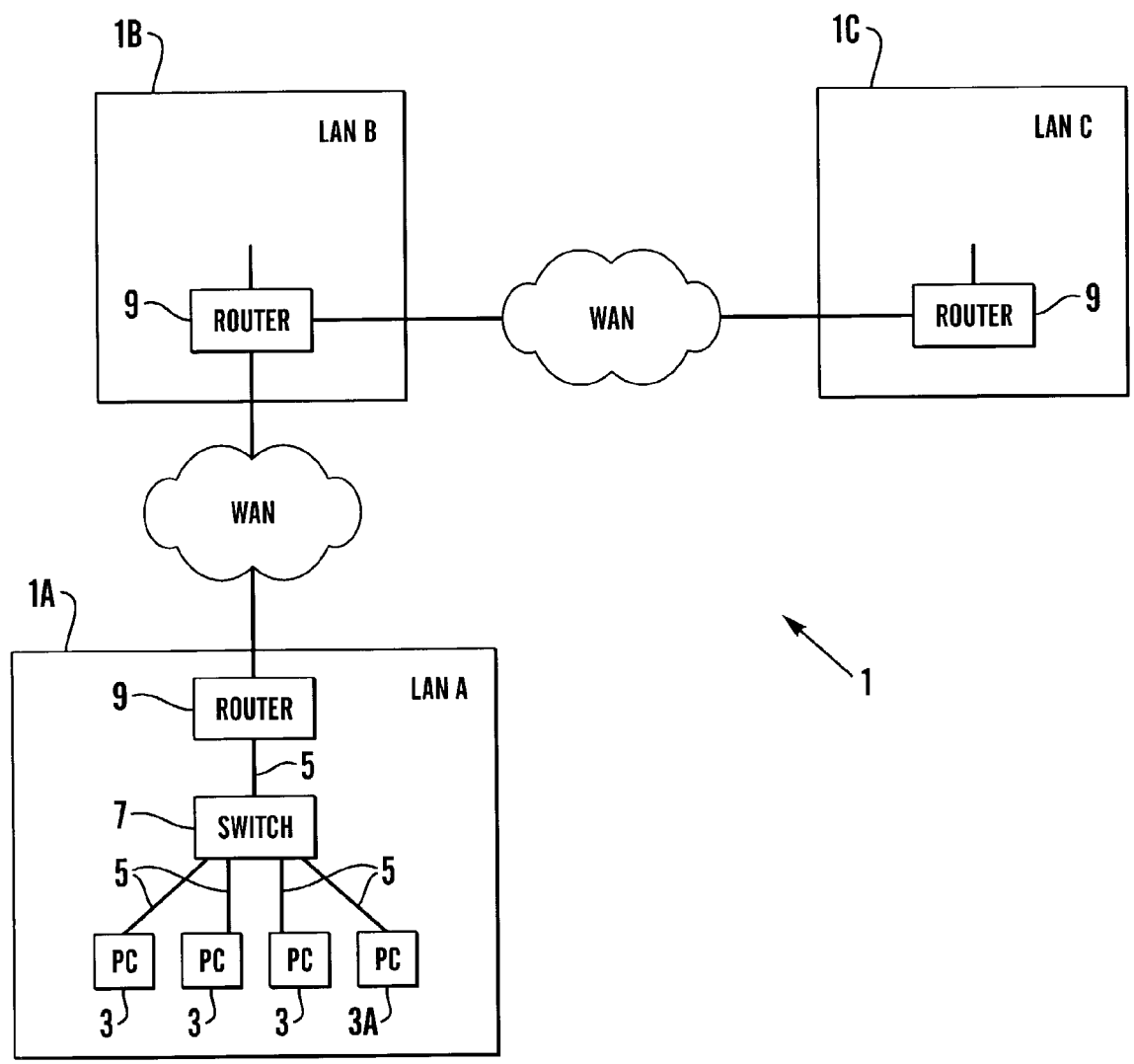
FIG. 1 illustrates an example of a typical network including a network management station performing periodic polling of network devices according to the present invention.

FIG. 1 shows a simple example of a Wide Area Network (WAN) 1 comprising a plurality of Local Area Network (LAN) subnets 1A, 1B and 1C (only LANA is shown in detail; the skilled person will appreciated that LANs B and C have similar configurations). Each subnet comprises a plurality of network devices comprising a router 9 connecting the subnet to the WAN by means of WAN links, and one or more core SNMP managed network devices 7 such as switches or hubs, and unmanaged workstations and PCs 3, all connected by media links 5 (which may be coaxial, twisted pair or fibre optic cable, or wireless links). As well known in the art, each managed network device includes an SNMP agent capable of monitoring data packets and storing MIB (Management Information Base) data which can be retrieved by an SNMP manager, in a network management station, in response to SNMP requests.

A network management station 3A includes a network management application which monitors the network by polling network devices by performing tests and sending requests to retrieve SNMP MIB data as described above.

The time interval between polling a particular network device is typically set to a default value in the network management application, the default value being dependent upon the characteristic of the network device being monitored. The default value for each characteristic is determined by the application vendor based on typical network configurations. Thus, the polling interval is not tailored to the particular network or networks being monitored by the network management application.

The method and apparatus of the present invention adjusts the polling interval for each monitored characteristic and for each device according to the network, specifically according to the nature (type and speed (data rate/bandwidth)) of the links between the network management station 3A, running the network management application, and the monitored network.

Figure 2:
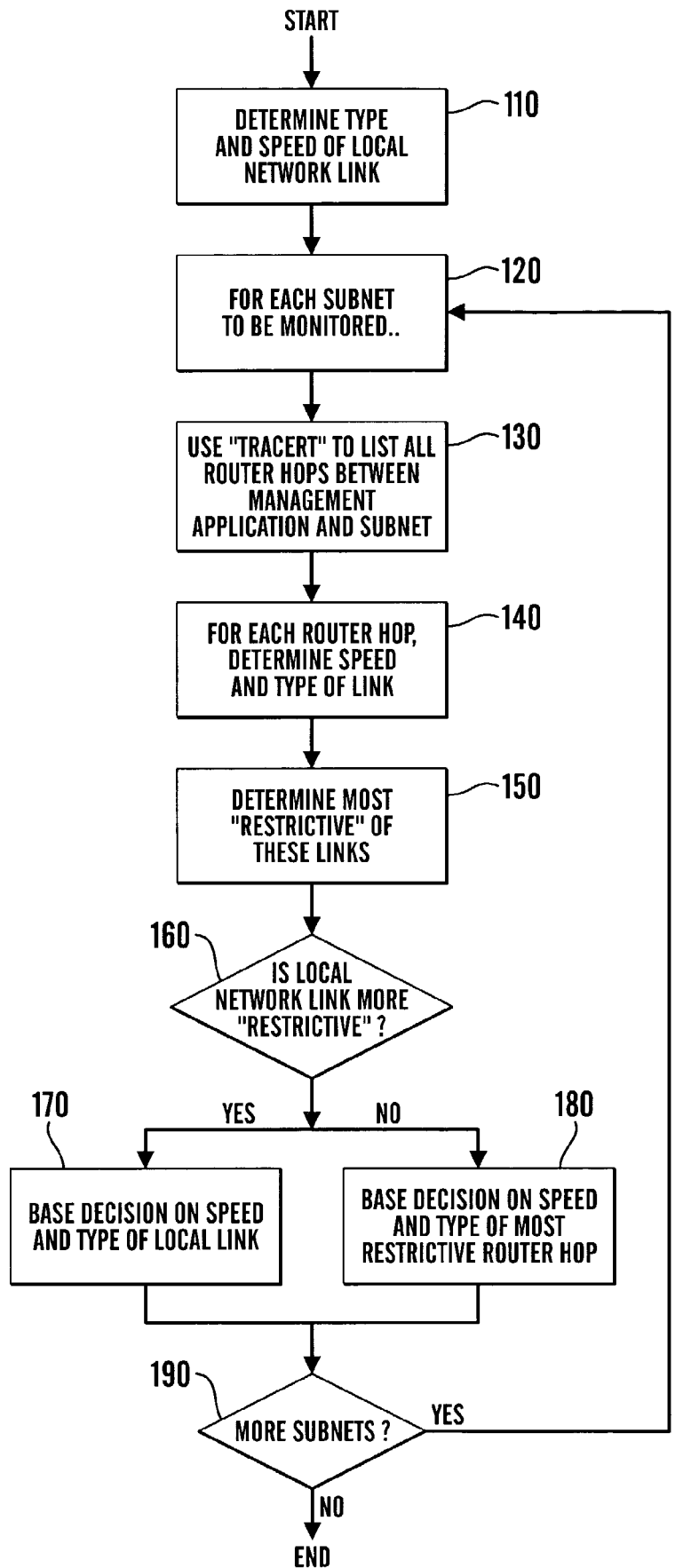
FIG. 2 is a flow diagram showing the steps performed by a computer program implementing a method according to a preferred embodiment of the present invention.

FIG. 2 illustrates a method for adjusting a polling interval in accordance with a preferred embodiment of the present invention. In order to implement the method of the present invention, all that is required is a list of the network devices to be polled, which may be stored in memory as a list of the IP addresses (or equivalent) of the network devices. It will be appreciated that in some embodiments, more detailed information about the topology of the network may be available.

The method is preferably implemented in the form of a computer program forming part of a network management application. The computer program is preferably provided in the form of a computer readable medium such as a magnetic or optical disk, for loading onto the network management station 3A, or may be downloaded as a carrier wave over a suitable communications medium from a website, for example. It will be appreciated that the method may also be implemented in other forms such as hardware.

The program starts at step 110 by determining the nature of the link of the local network on which the network management station 3A, running the network management application, is located. In particular, the network management application determines the type and speed of the network link to which the management station 3A is connected. This can be done using conventional techniques, well known in the art.

For example, the type and speed of the link can be determined from SNMP MIB data retrieved from the SNMP managed device to which the network management station 3A is connected. In particular, the standard SNMP "ifTable" in MIB II includes the variables "ifType" and "ifSpeed", which can be read for the particular link concerned. The "ifType" value is defined as "the type of interface, distinguished according to the physical/link protocol(s) immediately 'below' the network layer in the protocol stack" thus indicates the type of link. The "ifSpeed" value is defined as "an estimate of the interface's current bandwidth in bits per second" and indicates the operating speed of the link.

At step 120, the program then selects a first subnet, e.g. LANA, of the monitored network (WAN 1). The selection of a subnet can be performed on the basis of the IP addresses of the network devices to be polled. In particular, the program can identify a subnet from the "subnet number" within the IP addresses of the network devices.

At step 130, the program determines the path between the network management station 3A and the relevant subnet 1A (LANA). This is performed using conventional techniques. For example, the path may be determined using network topology information (if available) or by using the well known ICMP-based "TraceRoute" technique which finds routers on the path to the subnet 1A. In the illustrated embodiment, the determined path to the subnet only includes the links between LANs (i.e. the links connecting all the routers between the network management station and the subnet). It is not generally necessary to determine the unique paths to individual network devices on the subnet, since the links connecting devices on a subnet (LAN) are generally short and high speed, and so rarely introduce delays to polling traffic. Nevertheless, in other embodiments, it may be desirable to determine the paths to selected or all polled devices, including the subnet (LAN) links.

At step 140, the program determines the nature, specifically the speed and optionally the type, of each link on the path to the subnet determined in step 130. The speed and type of each link can be determined using conventional techniques, for instance using SNMP as described above in relation to step 110. Alternatively, the type and speed of one or more of the links may be obtained from the Telnet or web interface of a device connected to the link.

At step 150, the program identifies the most "restrictive" link of the links in the path to the subnet 1A based on the speed, and optionally the type, of links in the path, determined at step 140. The most restrictive link may be determined simply by comparing the speed (data rate) of the links in the path to the subnet, the most restrictive link being the link with the lowest link speed. Alternatively, in more complex embodiments, a "restrictiveness value" may be assigned for each type and speed of link, and the restrictiveness values for the links in the path compared in order to determine the most restrictive link. Thus, for example, a POTS link may have a highest restrictiveness value of, say 10, indicting the most restrictive link type and speed, and a dial on demand ISDN link may similarly have a high restrictiveness value of, say 9. In contrast, a high speed/bandwidth link may have relatively low restrictiveness value indicating a least restrictive link. A wireless link may have a moderate restrictiveness value, according to its type and speed, and so on.

At step 160 the program compares the speed and type of the most restrictive link, as determined at step 150, with the speed and type of the local link, and determines which is the most restrictive. Again, this may be performed by simply comparing the speed of the links, or by comparing "restrictiveness values" as described above.

If step 160 determines that the local link is the most restrictive link, the program proceeds to step 170 and determines the polling interval(s) according to the speed and type of the local link, as described below.

Alternatively, if step 160 determines that the local link is not the most restrictive link, the program proceeds to step 180 and determines the polling interval(s) according to the speed and type of the most restrictive link in the path, as determined at step 150, as described below.

At step 190, the program determines whether there are any more subnets to be considered by considering the list of IP addresses of network devices to be polled.

If there are more subnets to be considered, the program returns to step 120 and selects the next subnet. The program then proceeds with steps 130 to 170/180 for the new subnet.

The program continues until step 190 determined that there are no more subnets to consider and then ends.

The determination of the polling interval, at step 170 or step 180 according to the appropriate (most restrictive) link is performed as follows.

The polling interval needs to be chosen in order to limit the proportion of the bandwidth used by monitoring traffic over a given time period. The proportion of the bandwidth that may be used for monitoring traffic will depend on the nature of the most restrictive link. Thus for a high speed link, with relatively little other traffic, a greater proportion of the bandwidth may be appropriate, whereas a low speed shared link carrying large quantities of other traffic a lower proportion of the bandwidth. The polling interval is then determined based on the proportion of the bandwidth that is available for monitoring traffic, based on these factors.

For example, say for a particular type of link, up to 10% of the bandwidth is available for monitoring traffic. Then the threshold for link utilisation for monitoring traffic is 10% or 0.1.

The utilisation of the link by monitoring traffic is determined as an average utilisation over a time period, expressed as a percentage of the overall bandwidth.

Thus, the utilisation by monitoring traffic, U, is defined by the equation:

$$U = \frac{N/P}{B}$$

where:
B=the bandwidth of the link (in b/s)
N=the number of data bits sent and received per poll
P=polling interval (in s)

Since the bandwidth B is a fixed value (i.e. the link speed 64 kb/s, 10 Mb/s etc) and the number of data bits sent per poll N can be determined by the polling device, the polling interval P can be calculated so that the utilisation U is less that the threshold $U_T$ (e.g. 0.1 for 10%) using the equation:

$$P \geq \frac{N}{U_T B}$$

For dial on demand link types such as ISDN, for which a connection has to be established, the "period of inactivity", which leads to the link being broken, may also be taken into consideration when determining the polling interval. The period of inactivity which causes such a link to be broken may be entered manually by a network administrator, or determined by other conventional methods. The polling interval may be increased or reduced according to the period of inactivity and the available bandwidth. Alternatively, the method may determine that polling interval based on the link speed, and maintain the link in a constantly active state, by sending relatively small data packets on the link at periodic intervals less than the period of inactivity associated with the link.

Accordingly, the present invention enables the adaptation of the polling interval according to the polling environment. The present invention may be used to dynamically modify the polling interval, for each polled device (or for each polled device on a subnet), by monitoring the amount of polling traffic, particularly polling traffic sent on the most restrictive link or links to the device, in order to maintain the volume polling traffic below predetermined acceptable threshold levels.

As the skilled person will appreciate, various modifications and changes may be made to the described embodiments. It is intended to include all such variations, modifications and equivalents which fall within the spirit and scope of the present invention as defined in the accompanying claims.

The invention claimed is:

1. A method for determining a time interval for periodically polling a network device on a network, the method comprising
    determining a most restrictive link in a path to the network device from a second device, the restrictiveness of a link being dependent on the nature of the link
    determining the time interval according to the nature of the most restrictive link, and polling at a rate specified by the time interval, wherein the step of determining a most restrictive link to the network device comprises: determining the nature of at least the links between routers on a path to the network device, and determining the most restrictive link according to the determined nature of the links.

2. A method as claimed in claim 1, wherein the step of determining the most restrictive link comprises, for each link, determining a restrictiveness value based on the determined nature of the link; comparing the determined restrictiveness values, and determining as the most restrictive link the link having a highest or lowest restrictiveness value representing the most restrictive link.

3. A method as claimed in claim 1, wherein the step of determining the most restrictive link further includes identifying at least the links between routers on a path between the polling device and a subnet to which the network device is connected.

4. A method for determining a time interval for periodically polling a network device on a network, the method comprising determining a most restrictive link in a path to the network device from a second device, the restrictiveness of a link being dependent on the nature of the link, determining the time interval according to the nature of the most restrictive link, and polling at a rate specified by the time interval, wherein the time interval is determined such that data traffic generated by polling is less than a predetermined proportion of the bandwidth of the most restrictive link.

5. A method as claimed in claim 4, wherein the step of determining the time interval is performed using the equation:

$$P \geq \frac{N}{U_T B}$$

where:

P=the time interval (in s);

N=the number of data bits associated with a poll;

$U_T$=the proportion of the bandwidth that may be used for polling traffic, and

B=the bandwidth of the most restrictive link (in b/s).

6. An apparatus for determining a time interval for periodically polling a network device on a network, the apparatus determining the most restrictive link in a path from a second device to the network device, the level of restrictiveness of a link being dependent on the nature of the link, the apparatus determining the time interval in accordance with the nature of the determined most restrictive link, and polling at a rate specified by the time interval, wherein the most restrictive link to the network device is determined by determining the nature of at least the links between routers on a path to the network device, and determining the most restrictive link according to the determined nature of the links.

7. An apparatus as claimed in claim 6, further comprising a memory for storing restrictiveness values, each restrictiveness value corresponding to a nature of link, wherein, the apparatus is further configured to retrieve from memory a restrictiveness value for each link on a path to the network device, using the determined nature of the link, and to determine the most restrictive link by comparing the restrictiveness values for said links.

* * * * *